June 6, 1961

D. C. HORNEY 2,987,126

HITCH DEVICE

Filed July 14, 1958

INVENTOR.
DAVID C. HORNEY

BY
C. T. Parker  R. C. Johnson
ATTORNEYS

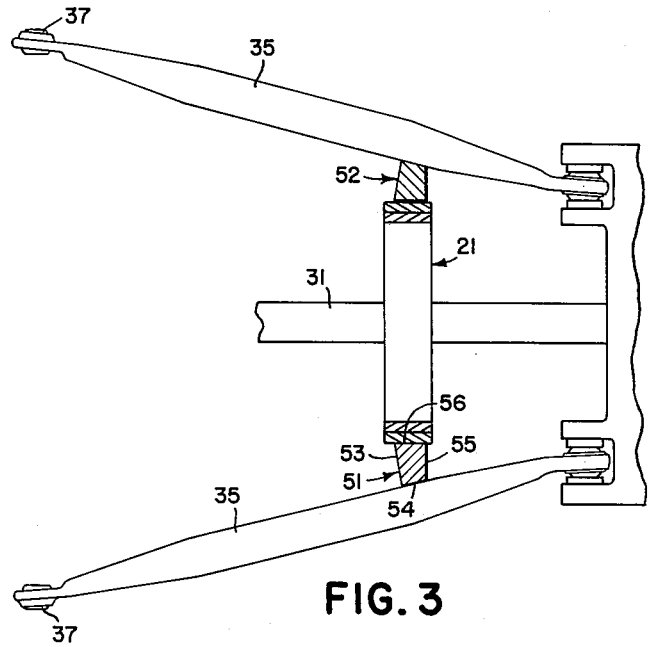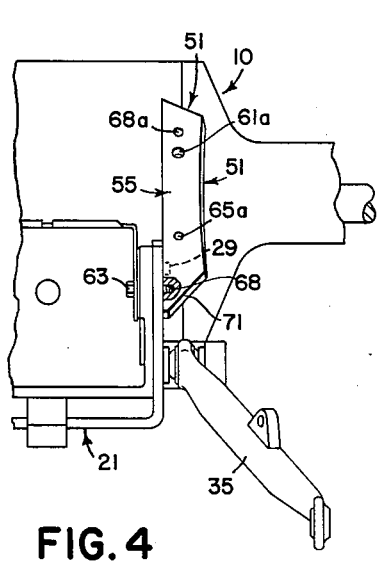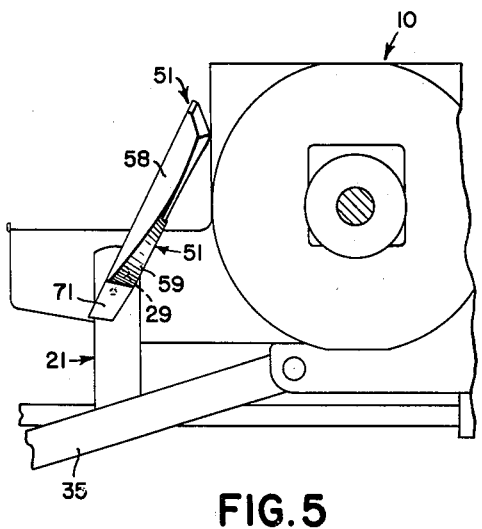

June 6, 1961  D. C. HORNEY  2,987,126
HITCH DEVICE

Filed July 14, 1958  3 Sheets-Sheet 3

INVENTOR.
DAVID C. HORNEY
BY
C. Parker R. C. Johnson
ATTORNEYS

United States Patent Office 2,987,126
Patented June 6, 1961

2,987,126
HITCH DEVICE
David C. Horney, Waterloo, Iowa, assignor, by mesne assignments, to Deere & Company, a corporation of Delaware
Filed July 14, 1958, Ser. No. 748,473
13 Claims. (Cl. 172—450)

The present invention relates generally to agricultural implements and more particularly to hitch means for connecting an implement to an associated supporting and propelling tractor.

The object and general nature of this invention is a provision of means associated with the usual tractor three point-hitch linkage mechanism for limiting the lateral movement of the associated implement relative to the tractor. Means of this general character have usually taken the form of pivoted links, auxiliary cams and other relatively complicated and expensive apparatus. The principal feature of the present invention is the provision of simple and inexpensive means so constructed and arranged to limit or control the lateral swinging of the draft links of a three point-hitch system so that lateral sway may be locked out, either throughout the entire raising or lowering range of the draft links, or only in the upper range when the implement is raised into a transport position. It is a further feature of this invention to provide such sway control means that, by means of a simple and easily performed operation, the draft links may be controlled when connected to an implement having a relatively wide spacing between the link-attaching points thereof, as well as when the implement has a smaller lateral spacing between its attaching points.

More specifically, it is a feature of this invention to provide a pair of link-contacting sway control members that are readily reversible end for end, so as to position the sway control blocks for limiting lateral swinging of the links, either throughout their full range of vertical movement, or only at generally the upper end of such range of vertical movement. An additional feature of this invention is the provision of sway control blocks of the character mentioned above, with means providing for readily changing the position of the blocks to accommodate receiving implements having different lateral spacing between the link-receiving attaching points thereon.

These and other objects and advantages of the present invention will be apparent to those skilled in the art after a consideration of the following detailed description, taken in conjunction with the accompanying drawings in which:

FIG. 1 is a rear view, looking forwardly, showing a portion of a tractor having a more or less conventional three point-hitch system and provided with sway control blocks constructed according to the principles of the present invention and disposed in such position on the tractor as to accommodate, first, an implement having a relatively wide spacing between the link-receiving attaching points, and second, providing for sway prevention throughout the entire range of vertical movement of the draft links.

FIG. 3 is a sectional view taken generally along the line 3—3 of FIG. 2.

FIG. 4 is a fragmentary view, similar to FIG. 1, showing the sway blocks swung upwardly into a position in which lateral swinging of the draft links is limited only in the upper or transport range of vertical movement of the draft links.

FIG. 5 is a side view of the sway block arrangement shown in FIG. 4.

Figure 1:
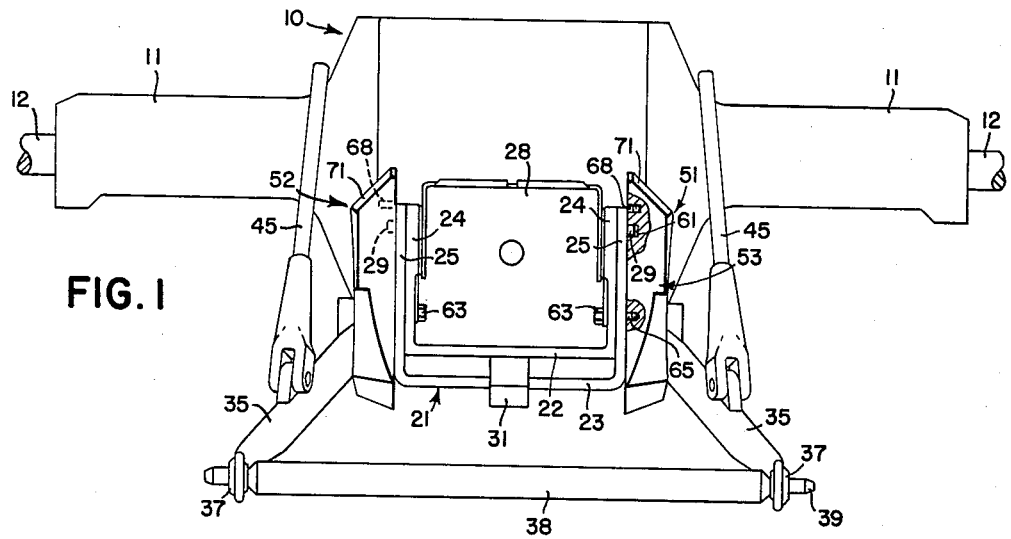
Figure 6:
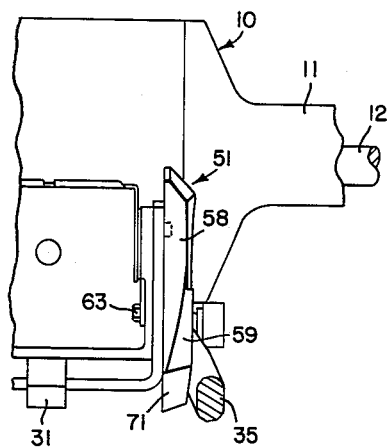

FIG. 6 is a view similar to FIGS. 1 and 4, showing the sway blocks turned through 90° about a generally vertical axis and fixed in place to accommodate implements having attaching points spaced closer together than the attaching points shown in FIGS. 1 and 3.

Figure 2:
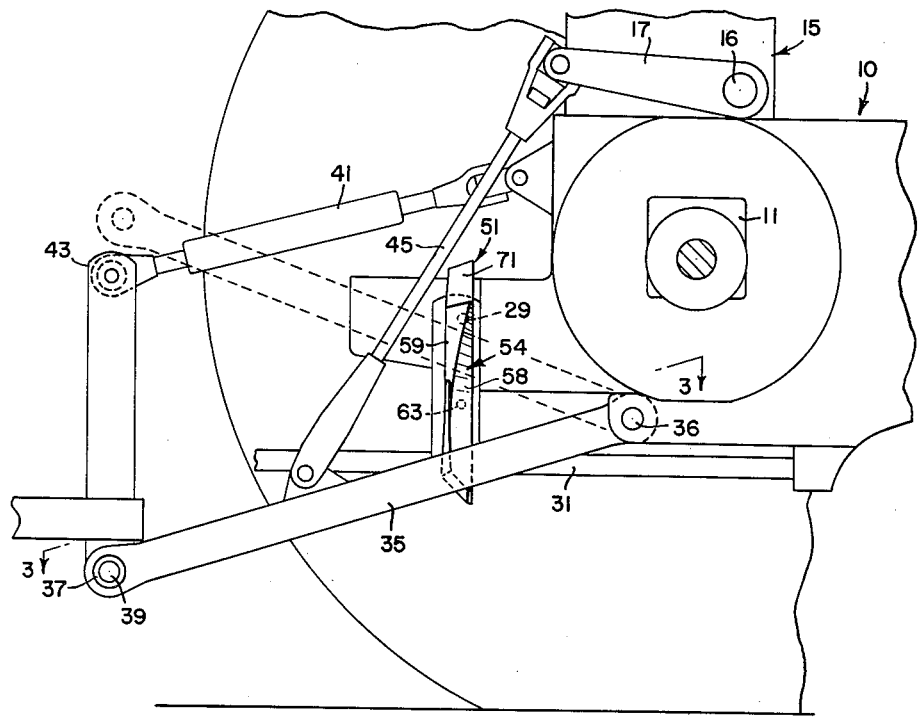
FIG. 2 is a side view of the structure shown in FIG. 1.
Figure 7:
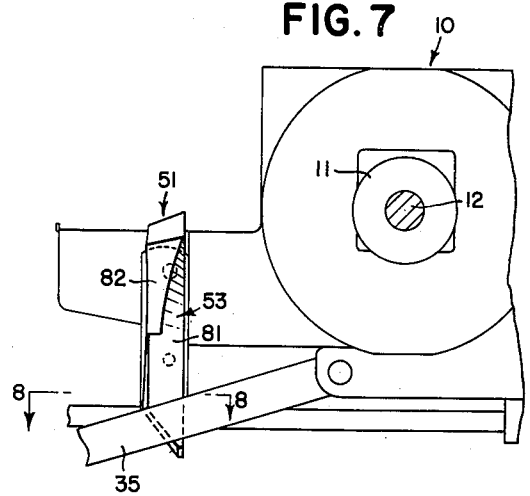

FIG. 7 is a view similar to FIG. 2 showing the sway blocks arranged as shown in FIG. 6.

Figure 8:
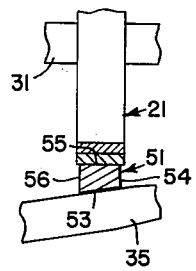

FIG. 8 is a fragmentary view, similar to FIG. 3, taken along the line 8—8 of FIG. 7.

Figure 9:
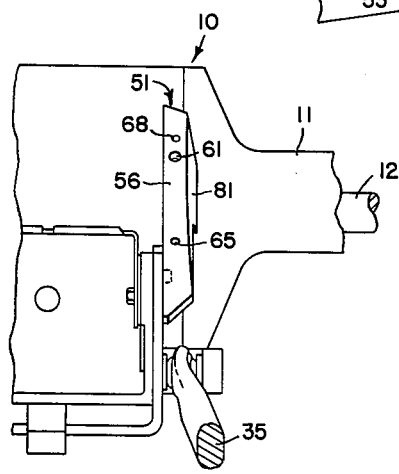

FIG. 9 is a fragmentary rear view similar to FIG. 4 but showing the sway blocks swung upwardly from the position illustrated in FIGS. 7 and 8.

Figure 10:
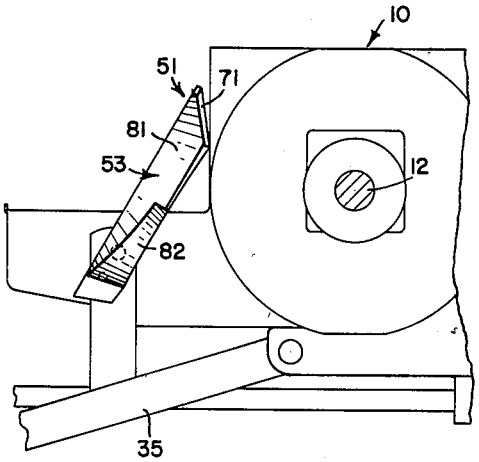

FIG. 10 is a side view of the structure of FIG. 9, showing the sway blocks, arranged for implements having the more closely spaced attaching points, swung upwardly into a position in which lateral sway is locked out only in the upper or transport position of the implement.

Referring first to FIGS. 1 and 2, the tractor is indicated in its entirety by the reference numeral 10 and includes rear axle means 11 in which axle shafts 12 are disposed, the shafts 12 carrying drive wheels. The tractor 10 also includes power lift mechanism indicated in its entirety by the reference numeral 15, such power lift means including a transverse rockshaft 16 to which lift arms 17 are fixed. The lower rear portion of the tractor 10 carries a rear drawbar support 21 that comprises a pair of U-shaped parts 22 and 23 having upstanding portions 24 and 25 arranged in overlapping relation and connected to the rear power take off shaft housing 28 of the tractor by means of a pair of socket head cap screws 29. The tractor drawbar is indicated at 31 and is movable laterally between the drawbar support sections 22 and 23, or it may be fixed in selected position, as desired.

The tractor 10 is also provided with a pair of laterally and vertically swingable draft links 35, each connected at its forward end, as at 36, FIG. 2, for generally universal movement relative to the tractor. The rear ends of the lower draft links 35 are provided with ball connectors 37 or other suitable means by which an implement may be connected in draft-receiving relation with the tractor 10. As shown in FIG. 1, the implement is represented by a cross shaft 38 having reduced ends 39 disposable in the ball connectors 36 and representing any suitable implement-attaching points by which the implement is connected with the rear ends of the laterally and vertically swingable draft links 35. The implement is also connected with the upper portion of the tractor by a compression link 41, the forward portion of the implement having an upper attaching point represented by the upper end of a mast section 43, FIG. 2. The draft links 35 are connected to be raised or lowered by operation of the tractor power lift system 15 by means of lift links 45.

The implement and tractor structure described above is largely conventional so far as the principles of the present invention are concerned. This invention is primarily concerned with the provision of new and improved sway control mechanism adapted to be carried by the tractor and cooperating with the laterally and vertically swingable links 35 for controlling and/or limiting the lateral swinging of the links 35 and the implement connected therewith, either throughout the full range of vertical movement of the links, or only in the generally upper positions of the links, as desired. The sway control mechanism of this invention includes means that accommodates different types of implements, some of which have relatively closely spaced link-receiving attaching points and others having relatively widely spaced link-receiving attaching points. FIGS. 1-5 show an arrangement particularly adapted for the more widely spaced implement attaching points, and the arrangement of this invention for the more closely spaced implement attaching points is shown in FIGS. 6 et seq.

The sway control mechanism of the present invention includes a pair of right and left hand sway control blocks indicated, respectively at 51 and 52. These blocks are substantially identical except that one is right hand and the other is left hand, and hence a detailed description of one, such as the right hand block 51, will suffice for a complete understanding of this invention.

Each sway block comprises an elongated generally straight member in the form of a block having four sides indicated at 53, 54, 55, and 56, FIG. 3. The sides 55 and 56 are substantially flat and are disposed at a 90° angle to one another in marginal contiguous relation. The other two sides, 53 and 54, are also arranged in contiguous relation but are of special configuration. It will be noted from FIG. 3 that the lateral distance between the sides 56 and 54 is greater than the distance between the sides 53 and 55 which also has a special advantage as will be developed below.

The side 54 (FIG. 2) of the sway control block 51 is made up of two generally curved sections 58 and 59 lying in partially overlapping relation. These sections 58 and 59 lie in conical surfaces the apices of which are disposed at opposite sides of the block 51, the sections 58 and 59 being thereby oppositely angled one with respect to the other. For example, when the block 51 is disposed in its lower or full sway lockout position, it will be seen from FIG. 2 that the section 58 lies in a conical surface, the apex of which substantially coincides with the point of connection 36 of the associated draft link 35 with the tractor, and it will be seen from FIG. 1 that when the power lift unit 15 is actuated to raise and lower the links 35, the latter swing upwardly relative to the tractor generally about a transverse horizontal axis that passes through the connection points 36. The lateral dimension of each of the blocks 51 and 52, that is, the dimension from sides 54 to 56, is such that when the rear ends of the draft links 35 are in the wider spacing, FIGS. 1 and 3, the generally conical sections 58 are disposed substantially contiguous to the path of movement of the adjacent portions or inner faces of the draft links 35. Thus, when the blocks 51 and 52 are arranged as shown in FIGS. 1-3 they effectively prevent any lateral swinging of the links 35 in either direction relative to the tractor, and the blocks 51 and 52 therefore prevent any lateral shifting of the associated implement relative to the tractor, in both the upper and lower positions of the links 35. In FIG. 2, the lower position of the links is indicated in full lines and the upper position in dotted lines.

The fastening means for fixing the blocks 51 and 52 to the tractor in the positions shown in FIGS. 1-3 will now be described. The upper end of each sway control block is provided with a generally cylindrical socket 61 that fits over the associated cylindrical socket head cap screw 29 so that the latter serves as a dowel holding the upper portion of each of the sway control blocks 51 and 52 in position relative to the tractor drawbar support 21. The attachment of the block is completed by a cap screw 63 that is threaded at its inner end and is extended through suitable openings in the drawbar support sections 24 and 25 and threaded into a tapped opening 65 in the side 56 of the sway control block slightly below the central portion thereof. Thus, when tightened, the cap screw 63 holds the associated block onto the rear drawbar support 21 and the socket head cap screw 29 cooperates with the associated block to hold the latter against fore-and-aft displacement. As shown in FIGS. 1 and 2, the sway control blocks 51 and 52 are effective throughout the full range of vertical swinging movement of the draft links 35 to prevent lateral swinging of the links with respect to the tractor.

There are implements, however, such as bedders, plows, and the like, that when in operation should be connected with the tractor so as to trail relative to the tractor, rather than be connected rigidly therewith. Yet, when such implements are raised as into a transport position, it is nevertheless desirable to prevent lateral shifting with respect to the tractor so as to keep them from colliding with the rear wheels 13 of the tractor or otherwise inadvertently swinging laterally out of the proper position for transport. The sway control blocks 51 and 52 of the present invention are easily shifted into a position to accommodate, rather than prevent, lateral swinging of the draft links 35 in their lower positions while preventing lateral swinging in the upper positions of the draft links 35. According to this invention, all that it is necessary to do is to remove the lower cap screws 63, reverse each sway control block by swinging it end for end generally about the socket head screws 29 into the position shown in FIGS. 4 and 5, and then reinsert the cap screws 63 in upper openings in the drawbar support sections 24 and 25 and thread the cap screws 63 into tapped openings 68 formed in the sway control blocks parallel to the tapped openings 65 but closer to what is the upper end when the blocks are in the positions shown in FIGS. 1 and 2.

In this second position (FIGS. 4 and 5) of the sway control blocks it will be seen that the blocks are disposed well above the normal operating positions of the draft links 35 but that, when the power lift is actuated to raise the implement into its transport position, the draft links 35 are raised upwardly into substantially close contact with the surfaces 59 on the sides 54 of the sway control blocks. Since the blocks have now been turned end for end, it will be seen that the surfaces or sections 59 are now disposed in generally conical surfaces the apices of which substantially coincide with the link-connecting points 36. It will also be observed that, in moving from the lower position to the upper position or transport position, the links 35 will first contact an outward angled cam portion 71 that is formed on one end of each control block. This is the end that is disposed upwardly when the blocks are arranged as shown in FIGS. 1 and 2 but downwardly when the blocks are disposed as shown in FIGS. 4 and 5. These angled cam or ramp sections 71 guide the links 35 into a centered position when the links on the associated implement are raised into their upper transport position.

Reference is made above to the fact that when the control blocks 51 and 52 are arranged as shown in FIGS. 1-5, particularly FIG. 3, the rear ends of the associated link 35 are arranged for attachment to the implements having a fairly wide spacing between the attachment points thereon. Some implements, however, have more closely spaced attaching points, as will be clear from FIGS. 6 and 9, and to accommodate implements of this character, all that it is necessary to do is to remove each sway control block 51 and 52, turn it around through approximately 90° about a generally vertical axis, and then fix the flat side 55 of each block to the rear drawbar support so as to present the curved sides 53 of the blocks laterally outwardly for engagement with the now more closely spaced draft links 35.

For the purpose of facilitating changing the sway control blocks 51 and 52 to the positions just referred to, the side 55 is provided with a dowel-receiving opening 61a (FIG. 4) and with a pair of tapped openings 65a and 68a for receiving the associated socket head 29 and cap screw 63 in the new positions of the sway control blocks 61 and 62 (FIGS. 6-10). When arranged in this way to receive implements having the more narrow spaced apart attachment points, the side 53 is presented for engagement by the adjacent portions of the draft links 35. Like the side 54 described above, the side 53 of each block also has oppositely angled generally curved surfaces or sections 81 and 82 that lie in oppositely arranged generally conical surfaces.

By virtue of this construction, the sway control blocks 51 and 52, when arranged as shown in FIGS. 6 and 7, prevent all lateral sway, both in the lower position of the draft links 35 as well as in the upper positions thereof, but when the blocks are swung upwardly, or reversed end for end, as shown in FIGS. 9 and 10, sway lockout is prevented only in the upper or transport positions of the links 35. In other words, the blocks as arranged in FIGS. 6–10 accommodate implements having the more closely spaced attaching points but function substantially exactly as they do for implements having the wider spaced apart attaching points, as indicated in FIGS. 1–5.

While I have shown and described above the preferred structure in which the principles of the present invention have been incorporated, it is to be understood that my invention is not to be limited to the particular details, shown and described above, but, that in fact, widely different means may be employed in the practice of the broader aspects of my invention.

What I claim, therefore and desire to secure by Letters Patent is:

1. In an implement hitch for a tractor having a draft link swingable both laterally and vertically relative to the tractor, a sway control block adapted to be disposed between the tractor and said draft link, said sway block comprising an elongated part, and means connecting one end portion of said part to the tractor whereby said block is rotatable to one or the other of two alternate positions about a generally transverse axis that lies closer to one end of the block than the other.

2. The invention set forth in claim 1, further characterized by said sway block being disposed in a generally vertical plane and said block being reversible end for end in said plane, and said block having generally oppositely angled spaced apart link engaging sections on the outer face of said block.

3. In an implement hitch for a tractor having a draft link swingable both laterally and vertically relative to the tractor, a sway control block for said draft link, comprising an elongated reversible member having link-engaging means at one side of said member, said means including a pair of oppositely angled sections, one or the other being disposable in link-engaging position by reversing said block end for end.

4. In an implement hitch for a tractor having a draft link swingable both laterally and vertically relative to the tractor, a sway control block for said draft link, comprising an elongated member reversible end for end and having link-engaging means at one side of said member, said link-engaging means including a pair of oppositely angled surfaces at one side of said reversible member and disposed adjacent one another and extending generally longitudinally of said reversible member, one of said surfaces being disposed adjacent one end of said member and the other of said surfaces being disposed adjacent the other end of said member.

5. A sway control block as defined in claim 4, further characterized by one of said surfaces extending substantially from one end of said member to the other end and the other surface terminating short of said last mentioned one end.

6. In an implement hitch for a tractor, a sway control block, said tractor having a draft link that is swingable in optional angular positions about a pivot axis and which for each position moves in a conical surface, the apex of which lies in said pivot axis, said sway control block comprising an elongated member having ends and four sides, two contiguous sides being substantially flat and the other sides being contiguous and shaped, respectively, to correspond to the conical surfaces containing the paths of movement of the associated link in two of said positions, and means connecting said member to the tractor with one or the other of said flat sides disposed against the tractor optionally.

7. A sway control block as defined in claim 6, further characterized by each of said other sides having a pair of oppositely angled link-engaging faces, the lateral dimension of said block, when measured from one of said substantially flat sides, being different from the lateral dimension of said block when measured from the other substantially flat side thereof.

8. For use with a tractor having a pair of laterally and vertically swingable laterally spaced apart generally rearwardly extending draft links, and block-receiving means disposed between said links, the improvement comprising a pair of elongated sway control blocks, means removably attaching each of said control blocks to said block-receiving means in either of two positions, the dimension of the block transversely of the tractor and generally perpendicular to the longitudinal axis of the block being greater in one of said positions than in the other position, whereby the lateral distance between laterally outwardly facing portions of said blocks is different in one position of the blocks than the corresponding distance in the other position, whereby said links are held in different positions according to the positions of said blocks.

9. In an implement hitch for a tractor having a pair of laterally spaced apart draft links normally swingable both laterally and vertically relative to the tractor and attachable to the implement at laterally spaced apart points thereon, the combination therewith of a pair of normally generally vertical sway control blocks disposable between the tractor and said draft links, and means connecting said blocks to the tractor in two optional positions, said block-connecting means comprising a first connecting means connecting the blocks to the tractor in a first position generally above the level of the forward ends of said draft links and a second connecting means connecting the blocks to the tractor in a second position such that the upper portions of said blocks lie above the level of the front ends of said draft links and the lower portions of the blocks lie below the level of front ends of said draft links, whereby in the first position said blocks limit lateral swinging of the links in their upper position only and in the second position the blocks limiting lateral swinging of the links in both upper and lower positions of the latter.

10. In an implement hitch for a tractor having a pair of laterally spaced apart draft links normally swingable both laterally and vertically relative to the tractor about laterally spaced apart points, said links being attachable to the implement at laterally spaced apart points thereon, the combination therewith of a pair of sway control blocks disposable between the tractor and said draft links, and means for fixing said blocks to the tractor in two optional positions, said means including pivot means accommodating swinging movement of each block in a vertical fore-and-aft extending plane so as to provide for end-to-end reversal of each block, said pivot means being located adjacent one end of each block so that each block in one position limits lateral swinging of the associated link substantially throughout its full range of vertical swinging and the block in its end-to-end reversed position limits lateral swinging of the associated link only in its upper range of vertical swinging.

11. In an implement hitch for a tractor having a pair of laterally spaced apart draft links normally swingable both laterally and vertically relative to the tractor about laterally spaced apart points, said links being attachable to the implement at laterally spaced apart points thereon, the combination therewith of a pair of sway control blocks disposable between the tractor and said draft links, and means fixing said blocks to the tractor in two optional positions, said means including pivot means accommodating swinging movement of each block in a vertical foreand-aft extending plane so as to provide for end-to-end reversal of each block, said pivot means being located adjacent one end of each block so that each block in one position limits lateral swinging of the associated link substantially throughout its full range of vertical swinging and the block in its end-to-end reversed position limits lateral swinging of the associated link only in its upper range of vertical swinging, the laterally outer face of each block having a first surface shaped to correspond generally to the path of movement of the adjacent portion of the associated link when the latter swings throughout its full range and the block is in said one position, and a second surface shaped to correspond generally to the path of movement of the adjacent portion of the associated link when the block is disposed in said reversed position.

12. The invention set forth in claim 11, further characterized by said first and second surfaces being portions of generally conical surfaces the apices of which lie in opposite positions relative to the associated block.

13. In an implement hitch for a tractor having a pair of laterally spaced apart draft links normally swingable both laterally and vertically relative to the tractor about laterally spaced apart points, said links being attachable to the implement at laterally spaced apart points thereon, the combination therewith of a pair of sway control blocks disposable between the tractor and said draft links, and means fixing said blocks to the tractor in two optional positions, said means including pivot means accommodating swinging movement of each block in a vertical fore-and-aft extending plane so as to provide for end-to-end reversal of each block, said pivot means being located adjacent one end of each block so that each block in one position limits lateral swinging of the associated link substantially throughout its full range of vertical swinging and the block in its end-to-end reversed position limits lateral swinging of the associated link only in its upper range of vertical swinging, the upper end of each block when in said one position presenting a downwardly and laterally outwardly angled surface that serves, when the block is reversed, to guide the associated link into a sway limited position when said link is raised.

References Cited in the file of this patent

UNITED STATES PATENTS

| | | |
|---|---|---|
| 1,767,114 | Bashor et al. | June 24, 1930 |
| 2,660,938 | Kaupke | Dec. 1, 1953 |
| 2,707,424 | Marvin | May 3, 1955 |
| 2,775,180 | Du Shane | Dec. 25, 1956 |
| 2,783,058 | Skibbe | Feb. 26, 1957 |
| 2,935,147 | Edman | May 3, 1960 |